United States Patent [19]

Wakabayashi

[11] Patent Number: 4,864,338
[45] Date of Patent: Sep. 5, 1989

[54] CAMERA HAVING PARTIALLY RETRACTABLE PICTURE TAKING OPTICAL SYSTEM WITH DUST COVER

[75] Inventor: Hiroshi Wakabayashi, Yokohama, Japan

[73] Assignee: Nikon Corporation, Tokyo, Japan

[21] Appl. No.: 206,043

[22] Filed: Jun. 13, 1988

Related U.S. Application Data

[62] Division of Ser. No. 8,321, Jan. 29, 1987, , which is a division of Ser. No. 677,516, Dec. 3, 1984, Pat. No. 4,669,848.

[30] Foreign Application Priority Data

| Dec. 7, 1983 | [JP] | Japan | 58-230883 |
| Dec. 7, 1983 | [JP] | Japan | 58-230884 |
| Dec. 15, 1983 | [JP] | Japan | 58-237014 |
| Feb. 17, 1984 | [JP] | Japan | 59-29050 |
| Feb. 21, 1984 | [JP] | Japan | 59-31141 |
| Mar. 23, 1984 | [JP] | Japan | 59-55786 |
| Apr. 16, 1984 | [JP] | Japan | 59-75991 |
| Apr. 19, 1984 | [JP] | Japan | 59-79062 |

[51] Int. Cl.[4] ............. G03B 17/04; G03B 17/00; G03B 5/00
[52] U.S. Cl. ................. 354/187; 354/202; 354/195.12
[58] Field of Search ............ 354/187, 195.1, 195.12, 354/202, 288 P, 288 R

[56] References Cited

U.S. PATENT DOCUMENTS

| 4,283,132 | 8/1981 | Engelsmann et al. | 354/202 |
| 4,336,986 | 6/1982 | Prochnou | 354/195.1 X |
| 4,350,423 | 9/1981 | Engelsmann et al. | 354/195.1 X |
| 4,410,253 | 10/1983 | Tsuboi | 354/195.1 |
| 4,595,268 | 6/1986 | Tsuboi | 354/202 X |
| 4,597,657 | 7/1986 | Wakabayashi | 354/187 X |
| 4,609,270 | 9/1986 | Kohno et al. | 354/288 P |
| 4,681,418 | 7/1987 | Kodaira | 354/288 P |
| 4,721,972 | 1/1988 | Wakabayashi | 354/195.1 |
| 4,728,977 | 3/1988 | Yomogizawa et al. | 354/195.1 X |
| 4,752,796 | 6/1988 | Tsukahara et al. | 354/202 X |

Primary Examiner—W. B. Perkey
Attorney, Agent, or Firm—Shapiro and Shapiro

[57] ABSTRACT

A camera having a picture taking optical system that includes a main lens system and a sub lens system and that performs in wide-angle and telephoto modes, has a cover member adapted to be closed forward of the optical system to protect the optical system. The cover member is driven by a coupling member moved in the direction of the optical axis together with the optical system in order to close the cover member. An electric circuit for the control of photography has an energizing switch, the actuation of which is involved in the driving of the cover member.

6 Claims, 10 Drawing Sheets

CAMERA HAVING PARTIALLY RETRACTABLE PICTURE TAKING OPTICAL SYSTEM WITH DUST COVER

This is a divisional patent application of U.S. Ser. No. 008,321, filed Jan. 29, 1987, now U.S. Pat. No. 4,678,048 which is a division of U.S. Ser. No. 677,516 filed Dec. 3, 1984 (Pat. No. 4,669,848 granted June 2, 1987).

BACKGROUND OF THE INVENTION

1. Field of the Invention

The present invention relates to a camera having a picture taking optical system including a main lens system and a sub lens system, for example, said camera being operable in a wide-angle mode only by the use of the main lens system and in a telephoto mode by the use of the combination of the main lens system with the sub lens system, said camera having a dust cover adapted to protect the optical system.

2. Description of the Prior Art

One of the prior art cameras of such a type is disclosed in Japanese Laid-open Patent Application No. 145930/1983. This camera comprises a drive mechanism for moving a sub lens between a position in which it is inserted into the optical path of a main lens and a position in which the sub lens is retracted from said optical path. In the inserted position, the sub lens is combined with the main lens to form a picture taking optical system. In the retracted position of the sub lens, another picture taking optical system is defined only by the main lens.

On designing of the above drive mechanism, it is most important that the combined optical system is formed under such a state that the main lens is exactly aligned with the sub lens with respect to the optical axis. Moreover, the movable sub lens must firmly be held stationary relative to the camera housing so as to be unaffected by external impact or vibration. Also, it is desirable that the camera be provided with a dust cover to protect the optical system.

SUMMARY OF THE INVENTION

It is a primary object of the present invention to provide a camera including a picture taking optical system of small and simple construction which can be changed to a plurality of optically functioning modes and including a dust cover to protect the optical system.

The present invention provides a camera comprising a housing; a photographing lens system having an optical axis and being adapted to slide in the direction of the optical axis between a position projected from said housing and a position retracted from said projected position toward said housing; a cover member adapted to be closed forwards of said lens system to protect said lens system; and cover driving means having a coupling member moved in the optical axis direction together with said lens system to close said cover member.

BRIEF DESCRIPTION OF THE DRAWINGS

FIGS. 14A, 14B and 14C are plan views showing, partially in section, a camera according to another embodiment of the present invention;

DESCRIPTION OF PREFERRED EMBODIMENTS

Figure 1:
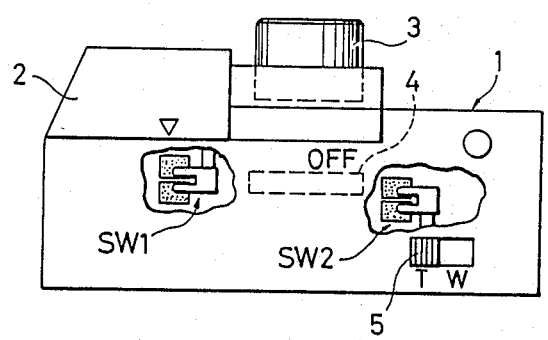
FIGS. 1 to 3 are plan views showing a camera according to one embodiment of the present invention, FIG. 1 showing a telephoto mode, FIG. 2 a wide-angle mode and FIG. 3 an inoperative mode.
Figure 2:
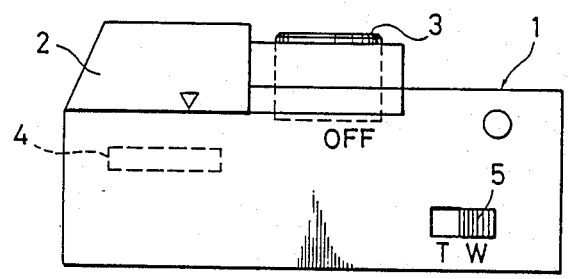
Figure 3:
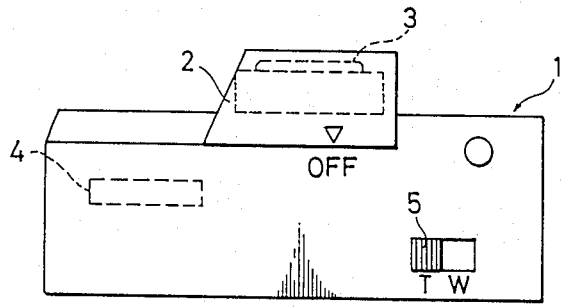

Referring now to FIGS. 1 to 3, there is shown a camera housing 1 comprising a dust cover 2 mounted on the front portion thereof so as to move leftward and rightward as viewed in the drawings, and a main lens 3 mounted on the same so as to move along its optical axis. The camera housing 1 contains a sub lens 4 which is movable transversely of the optical axis of the main lens 3. On the top of the camera housing 1 is mounted a knob 5 used to change the focal length of the optical system.

FIG. 1 shows the dust cover 2 in its open position. The knob 5 is in a position specifying a telephoto region designated by a letter "T". The main lens 3 is in its position forwardly moved from the front face of the cover 2. In this position, the main lens 3 is operatively combined with the sub lens 4, which has been inserted into the optical axis of the main lens 3, to form a combined optical system having a focal length in the telephoto region.

FIG. 2 shows the knob 5 in its position specifying a wide-angle region indicated by a letter "W". At the same time, the main lens 3 is retracted into the camera housing 1 while the sub lens 4 also is retracted away from the optical axis of the main lens 3. Thus, a focal length may be provided in the wide-angle region. In FIG. 3, the cover 2 is in its closed position in which the main lens 3 is covered by the cover 2. At this time, the main lens 3 is in its retracted position while the knob 5 is in its position indicative of the telephoto mode. The sub lens 4 also is in its retracted position. When the cover 2 is in its closed position, the inoperative position of the camera can visibly be recognized from the top of the camera by positioning an indicator on the top of the cover 2 at a position opposed to a letter "OFF" on the top of the camera housing 1.

The camera housing 1 further includes a switch SW1 operably associated with the cover 2 and a switch SW2 operably associated with the knob 5.

The switch SW1 consists of a sliding contact fixedly mounted on the cover and a conductive land fixedly located on the camera housing 1. When the cover is moved to its open position, this switch SW1 is turned on. When the cover is moved from its open position on its closed position, the switch SW1 is turned off. The switch SW1 is adapted to control the rotational direction of a motor 12 for driving the main lens 3 as will be described hereinafter and also to control the energization of a shutter control circuit 31 which will also be described hereinafter.

The switch SW2 consists of a sliding contact fixed to the knob 5 and a conductive land fixedly secured to the camera housing 1. The switch SW2 may be turned on or off depending on the position of the knob 5 such that the rotational direction of the motor 12 will be controlled. This switch SW2 is turned on when the knob 5 is in the telephoto position and turned off when the knob 5 is in the wide-angle position.

Figure 4:
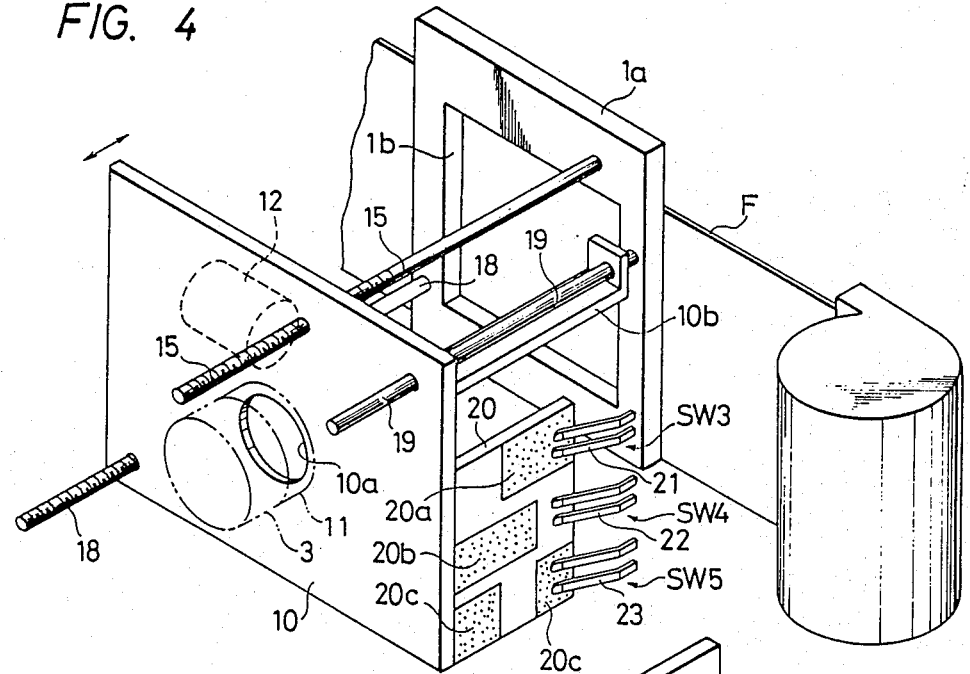
FIG. 4 is a perspective view showing a drive mechanism for a main lens in the above camera.

The main lens 3 is shifted by means of a mechanism shown in FIG. 4. FIG. 4 shows the main lens 3 in its extended position. A base plate 10 includes an opening 10a formed therethrough at the central portion, through which a light beam for a picture taking is passed. The main lens 3 as well as an aperture and shutter device 11 shown by phantom lines are fixedly mounted on the base plate 10 in front of the opening 10a. The inner wall of the base plate 10 fixedly supports the motor 12 the rotation of which is transmitted to a gear 14 as seen from FIG. 5. The gear 14 is threadedly connected with a guide shaft 15 such that the latter will be moved along its own longitudinal axis as the gear 14 is rotated by the motor 12. The extremity of the guide shaft 15 is secured to the substrate 1a of the camera housing 1. The rotating shaft of the motor 12 is drivingly engaged at the other end by a gear train 16 so that the rotation of the motor 12 will be transmitted to a final gear 17 in the gear train 16. The gear 17 is threadedly connected with a guide shaft 18 to slide it longitudinally when the gear 17 is rotated. The extremity of the guide shaft 18 is connected with the substrate 1a of the camera housing 1. This gearing is so designed that the revolution and direction of the gear 14 are equal to those of the gear 17 for a given revolution of the motor 12.

A guide shaft 19 is connected at one end with the substrate 1a of the camera housing 1 such that the guide shaft 19 is slidably supported relative to the base plate 10 by means of an arm 10b which extends from the inner wall of the base plate 10.

The side of the base plate 10 fixedly supports a printed substrate 20 on the outer surface of which conductive lands 20a to 20c are provided. These conductive lands may slidably be engaged by three sliding contacts 21 to 23 on the camera housing, respectively. Each of the sliding contacts 21, 22 or 23 defines a switch SW3, SW4 or SW5 co-operating with the corresponding conductive land 20a, 20b or 20c. The switch SW3 is turned off when the main lens 3 is in its retracted position; the switch SW4 is turned off when the main lens 3 is in its extended position; and the switch SW5 is turned off when the main lens 3 is in its intermediate position between the retracted and extended positions. The switches SW3 and SW4 serves as limit switches for de-energizing the motor 12 as the main lens 3 is moved to its retracted or extended position. The switch SW5 is adapted to de-energize the shutter control circuit 31 such that the camera becomes inoperative when the main lens 3 is in the intermediate position between the retracted and extended positions to prevent the image of an object from being formed on the film plane.

A film F is disposed rearwardly of the framing opening 1b formed in the substrate 1a.

Figure 5:
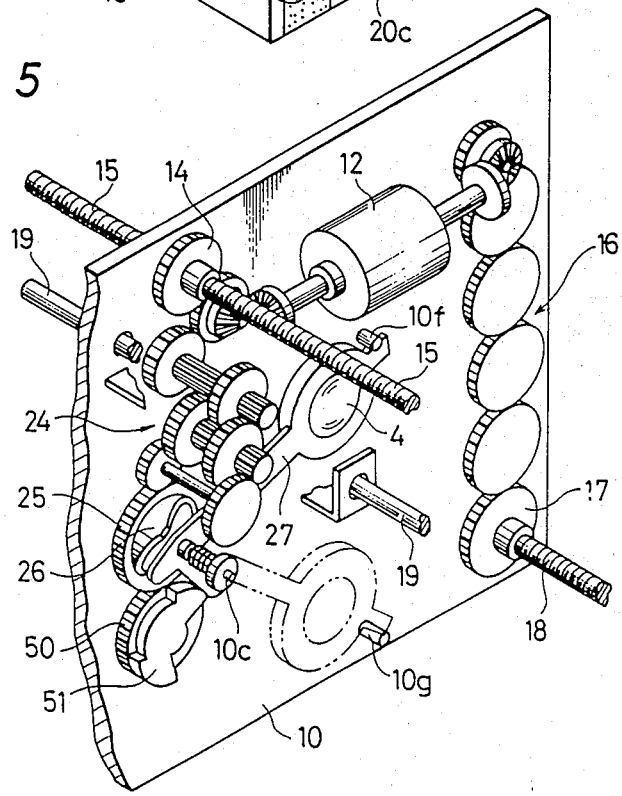
FIG. 5 is a perspective view showing a mechanism for driving a sub lens in the above camera.

As seen from FIG. 5, the inner wall of the base plate 10 operably supports a reduction gear train 24, a cam gear 25 and a holder 27. The holder 27 in turn supports the sub lens 4. The reduction gear train 24 serves to transmit the rotation of the above motor 12 to the cam gear 25. The cam gear 25 and the holder 27 are mounted on a common shaft and connected with each other through a face cam 26 formed on the top face of the cam gear.

The ratio of the reduction gear train 24 is so selected that the sub lens 4 will be inserted into the picture taking optical path as shown by solid lines when the main lens 3 is in its extended position and that the sub lens 4 will be retracted out of the picture taking optical path as shown by phantom lines when the main lens 3 is in its retracted position.

Figure 6:
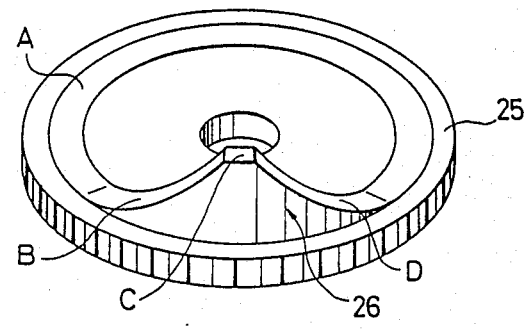
FIG. 6 is a perspective view of a face cam.

The cam gear 25 is engaged by a gear 50 having the same number of teeth as those of the cam gear 25. The gear 50 includes an interceptive plate 51 formed integrally thereon at one side. Thus, the interceptive plate 51 will be rotated synchronously with the rotation of the cam 26. As seen from FIG. 6, the face cam 26 is of an annulus configuration providing a lift in the rotational direction of the gear 25.

Figure 7A:
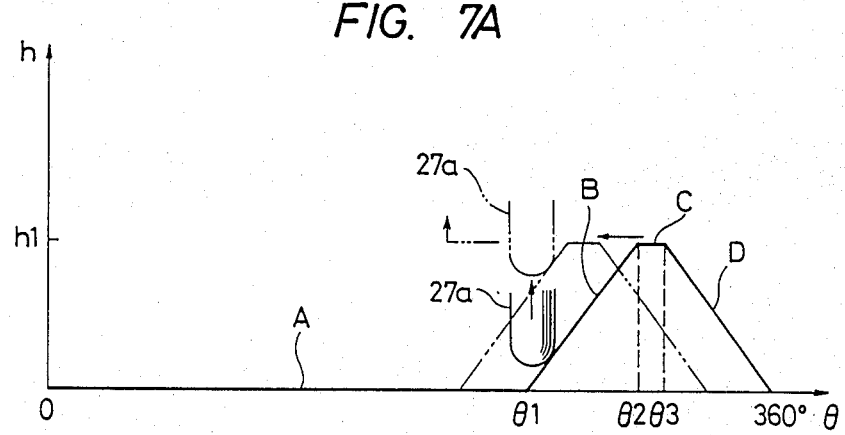
FIGS. 7A and 7B are diagrams showing the profile of the face cam and associated operations.
Figure 7B:
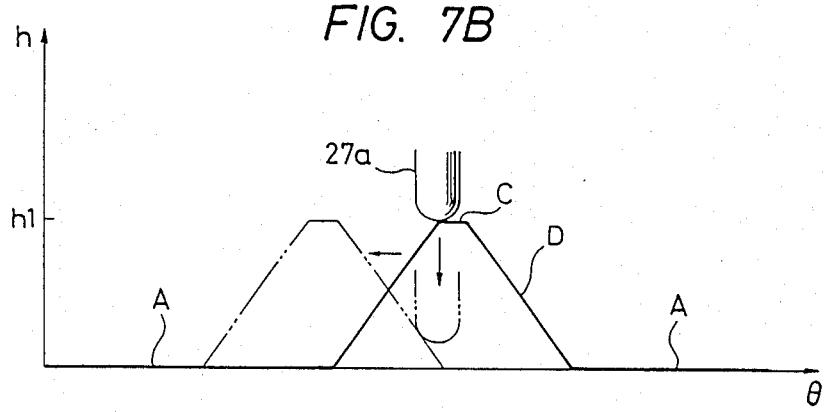

FIGS. 7A and 7B show the cam diagram of the cam 26 which includes a first flat section A having no lift between rotational angles 0 and $\theta 1$, a first ramp section B providing the lift h linearly increasing from zero to h1, a second flat section C providing the lift h held at h1 between $\theta 2$ and $\theta 3$, and a second ramp section D providing the lift h linearly decreasing from h1 to zero between $\theta 3$ and 360°.

Figure 8A:
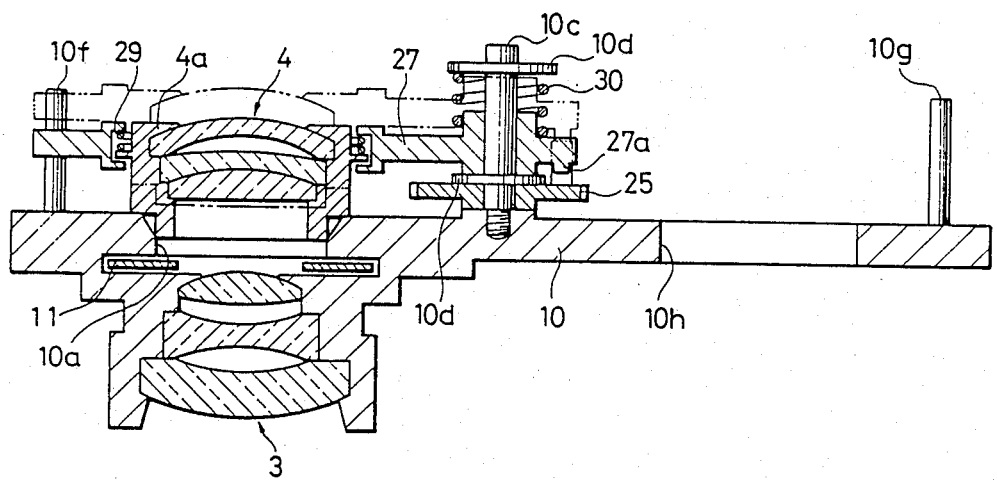
FIGS. 8A and 8B are cross-sectional views showing the drive mechanism for the sub lens.
Figure 8B:
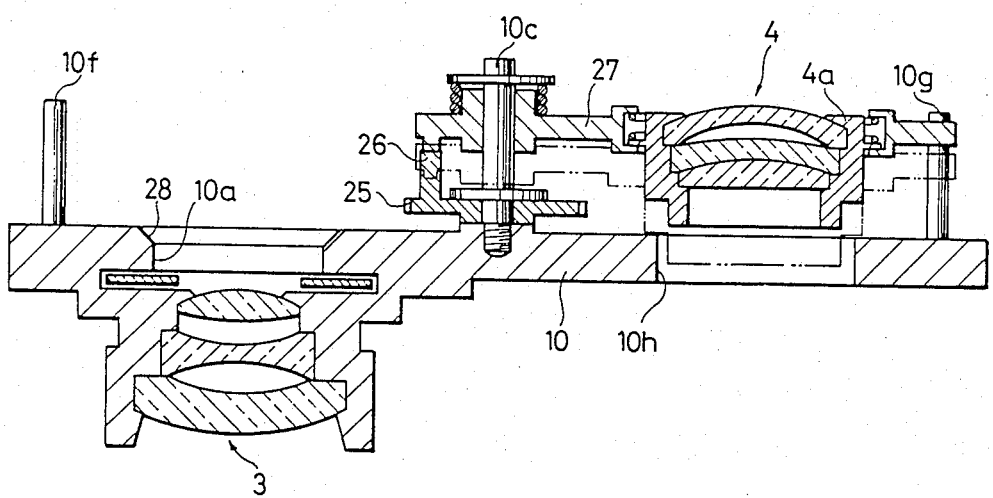

FIGS. 8A and 8B illustrate a mechanism for driving the sub lens.

As seen from FIGS. 8A and 8B, the main lens 3 and the aperture and shutter device 11 are fixedly mounted on the base plate 10 in front of the opening 10a which is formed at the inlet side with a chamfered guide face 28.

The sub lens 4 is held by means of a cylinder 4a formed at the lower portion with a sleeve and flange. When the sleeve of the cylinder 4a is engaged by the inner circumference of the opening 10a and the flange of the same is engaged by the inner wall of the base plate 10, the optical axis of the sub lens 4 will be aligned with that of the main lens 3. At the same time, the sub lens 4 will be positioned in place along the optical axis.

The holder 27 is rotatably mounted about a stationary shaft 10c standing on the base plate 10 such that the holder 27 can be slid and rotated between two flanges 10d on the shaft 10c. The holder 27 is downwardly biased by means of a coil spring 30. The central portion of the holder 27 contains the cylinder 4a which is urged downwardly by means of a coil spring 29.

The cam face 26 on the cam gear 25 is in contact with a stylus 27a formed in the underside of the holder 27. The free end of the holder 27 will engage a fixed pin 10f when the sub lens 4 is in a position shown in FIG. 8A and a fixed pin 10g when the sub lens 4 is in a position shown in FIG. 8B.

The base plate 10 further includes a circular hole 10h formed therein in which the sleeve of the cylinder 4a will fall when the cylinder 4a is retracted out of the optical path of the main lens.

Figure 9:
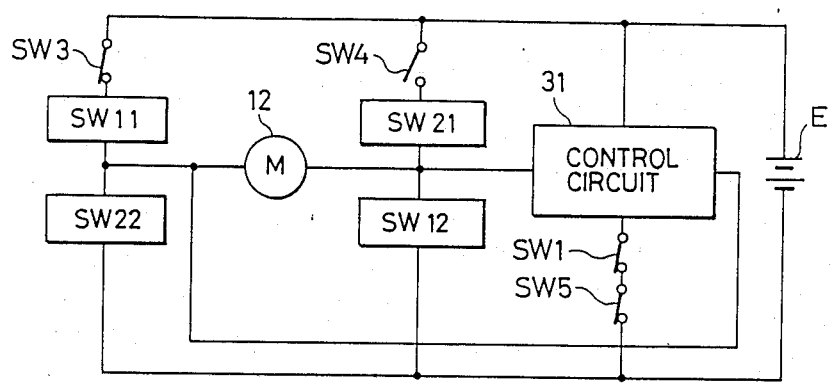
FIG. 9 is a circuit diagram of a motor control.

FIG. 9 shows a control circuit for the motor 12 adapted to the lenses 3 and 4. As seen from FIG. 9, the motor 12 may be energized through either of three supply paths. The first path includes the positive terminal of a power supply E, the switch SW3, the switch SW11, the motor 12, the switch SW12 and the negative terminal of the power supply E. When the motor 12 is energized through the first path, it is forwardly rotated to move the main lens 3 to its refracted position and at the same time to move the sub lens 4 to its retracted position.

The second path includes the positive terminal of the power supply E, the switch SW4, the switch SW21, the motor 12, the switch SW22 and the negative terminal of the power supply E. When the motor is energized through the second path, it is rearwardly rotated to move the main lens 3 to its extended position and simultaneously to move the sub lens 4 to its inserted or operative position.

Figure 10:
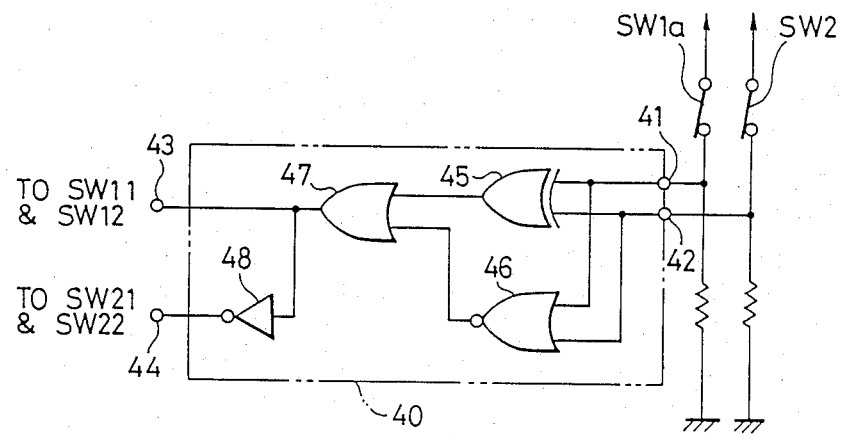
FIG. 10 is a diagram of a logic circuit.

The switches SW11, SW12, SW21 and SW22 are in the form of a semiconductor switch controlled through a logic circuit 40 shown in FIG. 10.

The third path connects the motor 12 with a circuit 31 for automatically adjusting the focus and controlling the shutter. The motor will be rotated forwardly and rearwardly by the output of this control circuit 31 to move the optical system forwardly and rearwardly along the optical axis to provide a proper focus.

The switches SW1 and SW5 are connected in series with each other and inserted into the supply path of the control circuit 31. The switch SW1 is turned on only when the cover 2 is in its open position. The switch SW5 is turned on only when the main lens 3 is in either of the extended and retracted positions. In such a manner, the automatic focus adjustment and shutter may be prevented from operating when the cover 2 and lenses 3, 4 are in their unsuitable positions for picture taking.

As shown in FIG. 10, the logic circuit 40 includes a pair of input terminals 41, 42 and a pair of output terminals 43, 44. The input terminal 41 is connected between a switch SW1a operably associated in phase with the above switch SW1 and an earth resistance; the input terminal 42 is connected between the above switch SW2 and the earth resistance; the output terminal 43 is connected with the control terminals of the switches SW11 and SW12; and the output terminal 44 is connected with the control terminals of the switches SW21 and SW22. The input terminal 41 becomes High level when the switch SW1a is turned on, that is, when the cover 2 is opened and becomes Low level when the switch SW1a is turned off, that is, when the cover 2 is closed. The input terminal 42 becomes High level when the switch SW2 is turned on, that is, when the knob 5 is in its telephoto position and becomes Low level when the switch SW2 is turned off, that is, when the knob 5 is in its wide-angle position. At High level, the output terminal 43 brings both the switches SW11 and SW12 into their ON positions. At Low level, these switches SW11 and SW12 are turned off by the output terminal 43. The output terminal 44 brings both the switches SW21 and SW22 into their ON positions at High level and into their OFF positions at Low level, respectively.

The input terminal 41 is connected with one input terminal of an exclusive OR gate 45 and one input terminal of a NOR gate 46. The input terminal 42 is connected with the other input terminal of the exclusive OR gate 45 and the other input terminal of the NOR gate 46. The output terminals of the gates 45 and 46 are connected with two input terminals of an OR gate 47, respectively. The output terminal of the OR gate 47 is connected with the output terminal 43 and an input terminal of an invertor 48. The output terminal of the invertor 48 is connected with the output terminal 44.

The following table collectively shows the position of the cover 2, the position of the knob 5, the states of the switches SW1 and SW2 depending on the positions of the cover and knob, the states of the input terminals 41, 42 of the logic circuit 40, the levels of the output terminals 43, 44, the states of the switches SW11, SW12, SW21, and SW22, and the positional relationship between the main and sub lenses 3, 4.

TABLE

| POS. 2 | POS. 5 | SW1 | SW2 | 41 | 42 | 43 | 44 | SW11 SW12 | SW21 SW22 | POS. 3 | POS. 4 |
|---|---|---|---|---|---|---|---|---|---|---|---|
| OPEN | T | ON | ON | H | H | L | H | OFF | ON | EXTENDED | FULL INSERTION |
| OPEN | W | ON | OFF | H | L | H | L | ON | OFF | RETRACTED | FULL RETRACTION |
| CLOSE | T | OFF | ON | L | H | H | L | ON | OFF | RETRACTED | FULL RETRACTION |
| CLOSE | W | OFF | OFF | L | L | H | L | ON | OFF | RETRACTED | FULL RETRACTION |

(1) When the cover 2 is opened and the knob 5 is aligned with the letter "T" as shown in FIG. 1 and if the main lens 3 has already been in its extended position, the switches SW1 and SW2 are both in their ON states so that both the input terminals 41 and 42 of the logic circuit 40 become High level. The output terminals of the exclusive OR gate 45 and the NOR gate 46 become Low level while the output terminal of the OR gate 47 also becomes Low level. Thus, the output terminals 43 and 44 of the logic circuit 40 become Low and High levels respectively. Therefore, the switches SW11 and SW12 shown in FIG. 9 will be turned off so that the first path mentioned above will not be formed. Although the switches SW21 and SW22 are turned on, the second path mentioned above will not also be formed since the main lens 3 is in its extended position to hold the switch SW4 at its OFF position as shown in FIG. 4.

Under such a situation, the sub lens 4 is held at its fully inserted position in which the cylinder 4a is totally engaged by the opening 10a as shown in FIG. 8A. Consequently, a composite optical system will be defined by the main and sub lenses 3 and 4 with its focal length being in the telephoto region. Since both the switches SW1 and SW5 are in their ON states, the control circuit 31 is operable and then the telephoto optical system is operable for picture taking.

When the picture taking operation is initiated, the motor 12 is then energized through the third path to move the main and sub lenses 3, 4 along the optical axis from a position near the telephoto region to infinity for focus adjustment.

During rotation of the motor 12 for focus adjustment in the telephoto region, the stylus 27a of the holder 27 is positioned opposed to the first flat section A of the cam 25 without contact.

(2) When the knob 5 is moved from such a state as shown in FIG. 1 to the position opposed to the letter "W", the switch SW2 is turned off to bring the input terminal 42 of the logic circuit 40 into Low level. Thus, the output terminals 43 and 44 are inverted to High and Low levels, respectively. Therefore, the switches SW11 and SW12 shown in FIG. 9 are turned on while the switches SW21 and SW22 are turned off. Since the switch SW3 is in its On state, the first path mentioned above will be formed to rotate the motor 12 forwardly. As a result, the base plate 10 will be moved toward the substrate 1a with the main lens 3.

During the initial rotation of the motor 12, the sub lens 4 is upwardly moved along the optical axis from the fully inserted position to a position as shown by phantom lines in FIG. 8A. This upward movement of the sub lens 4 is produced by the fact that the cam 26 is rotated clockwise, that is, the cam diagram of FIG. 7A is moved leftward as shown by phantom lines such that the stylus 27a of the holder 27 is lifted by the ramp B of the face cam.

Figure 11A:
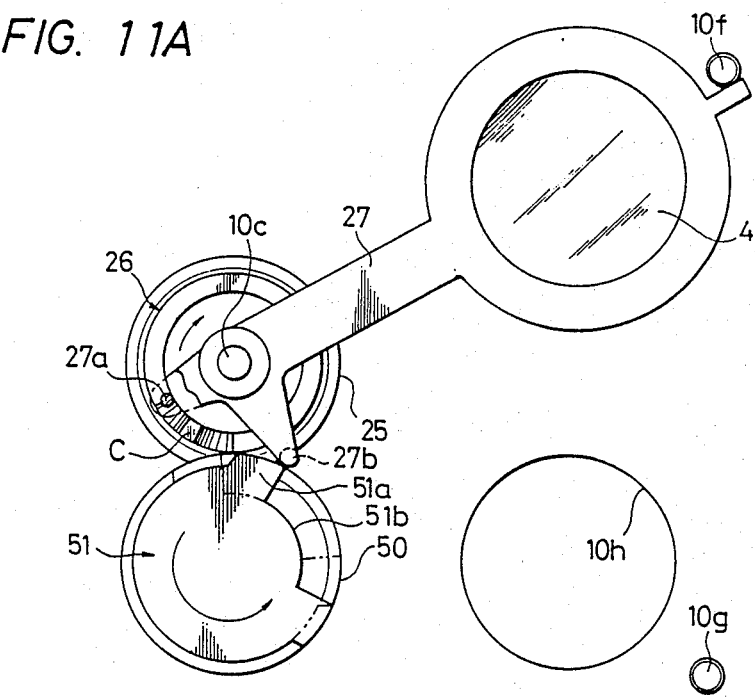
FIGS. 11A and 11B are plan views of the sub lens driving mechanism.

FIG. 11A is a plan view showing the positional relationship of the cam 26, the holder 27 and the interceptive plate 51 of the gear 50, corresponding to the state shown in FIGS. 7A and 8A. Under the state of FIG. 7A in which the stylus 27a is positioned opposed to a region between the cam sections A and B, the engagement portion 27b of the holder 27 contacts the shoulder 51a of the interceptive plate 51 so that the clockwise rotation of the holder 27 will be intercepted. When the cam is rotated to lift the holder 27 as the result of the initial rotation of the gears 25 and 50 in the direction of the arrows, a notch 51b is the interceptive plate 51 is positioned opposed to the engagement portion 27b. Since the cylinder 4a has been disengaged from the opening 10a by the upward movement of the holder 27, the latter is rotated clockwise about the shaft 10c with the stylus 27a biased upwardly by the cam ramp B. When the tip of the holder 27 is engaged by the fixed pin 10g, a further rotation of the holder 27 is intercepted, but the cam 26 is further rotated until the stylus 27a rides the section C.

Figure 11B:
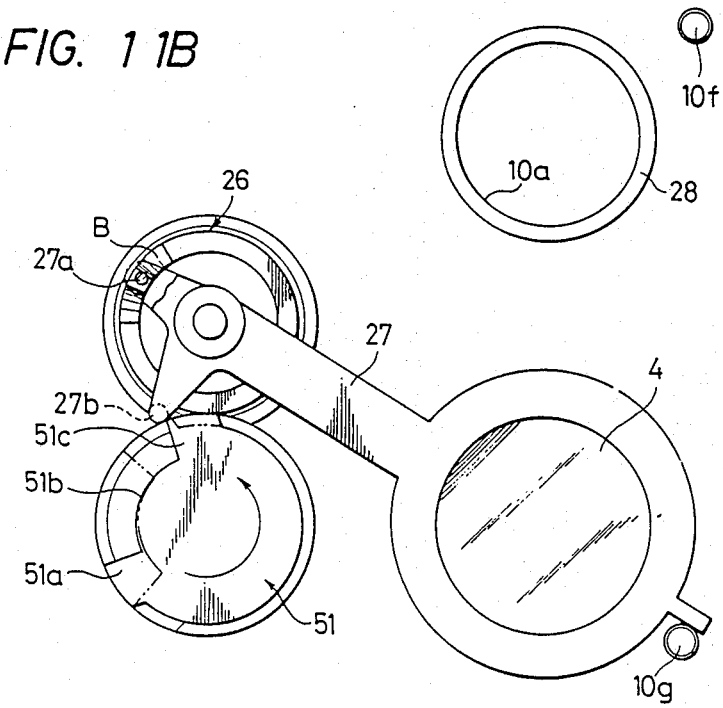

Such a condition is shown in FIGS. 7B, 8B and 11B. As seen from FIG. 11B, the other shoulder 51c of the interceptive plate 51 contacts the stylus 27b to prevent the rearward rotation of the holder 27.

When the motor is further rotated, the second ramp section D of the cam is brought under the stylus 27a. The holder follows the descendent ramp of the cam and is downwardly moved resiliently under the action of the spring 30 until the cylinder 4a is inserted into the circular hole 10h of the base plate. In this manner, the sub lens 4 will be fully retracted out of the optical path in the main lens 3. Various positions of the components at this time are shown by phantom lines in FIGS. 7B, 8B and 11B.

When the main lens 3 reaches its retracted position, the switches SW3, SW4 and SW5 are turned off, on and on, respectively. When the switch SW3 is turned off, the first path mentioned above is cut off to de-energize the motor 12. Therefore, the main and sub lenses 3 and 4 are held stationary at their fully retracted position. The optical system will thus be defined only by the main lens 3 with the focal length thereof being in the wide-angle region. Since both the switches SW1 and SW5 are in their ON state, the control circuit 31 is operative to provide control of the wide-angle optical system.

When the picture taking operation is initiated under such a situation, the motor 12 is energized through the third path to rotate in such a manner that the main lens 3 is moved along the optical axis from a position near the wide-angle region to infinity for focus adjustment.

During rotation of the motor 12 for focus adjustment in the wide-angle region, the stylus 27a is aligned with the first flat section A of the cam. Thus, the holder 27 is not moved, so as to keep the sub lens 4 at its fully retracted position.

(3) When the cover 2 is moved from the open position of FIG. 1 toward the closed position, the switch SW1 is turned off so that the input terminal 41 of the logic circuit 40 becomes Low level and the output terminal of the exclusive OR circuit 45 becomes High level. The proceeding operations are similar to those described in connection with the above process (2). In spite of the knob 5 being located at the telephoto position, the main lens 3 may be moved from its extended to retracted position while at the same time the sub lens 4 may be shifted from its fully inserted to fully retracted position. When the main lens 3 is moved to its retracted position, the cover 2 can be closed completely. When the cover 2 reaches its closed position, the switch SW1a operated in phase with the switch SW1 is turned off such that the control circuit 31 will be de-energized to make the camera inoperative. This state is shown in FIG. 3.

(4) When the cover 2 is moved from the position of FIG. 2 to the closed position, the switch SW1a operated in phase with the switch SW1 is turned off such that the control circuit 31 will be de-energized to hold the camera inoperative.

(5) When the knob 5 is shifted from the position of FIG. 2 to the telephoto position, the switch SW2 is turned on to bring both the input terminals 41 and 42 of the logic circuit 40 into High level and to invert the output terminals 43 and 44 into Low and High level, respectively. Since the switch SW4 is in its ON state at this time, the second path mentioned above is formed so that the motor 12 begins to rotate in the direction opposite to that in the process (2). Thus, the main lens 3 begins to move from the retracted to extended position.

The rearward rotation of the motor 12 causes the gears 25 and 50 to rotate rearwardly also. Accordingly, the sub lens 4 is shifted through the opposite process to the aforementioned process so that the cylinder 4a will again be inserted into the opening 10a.

Figure 12:
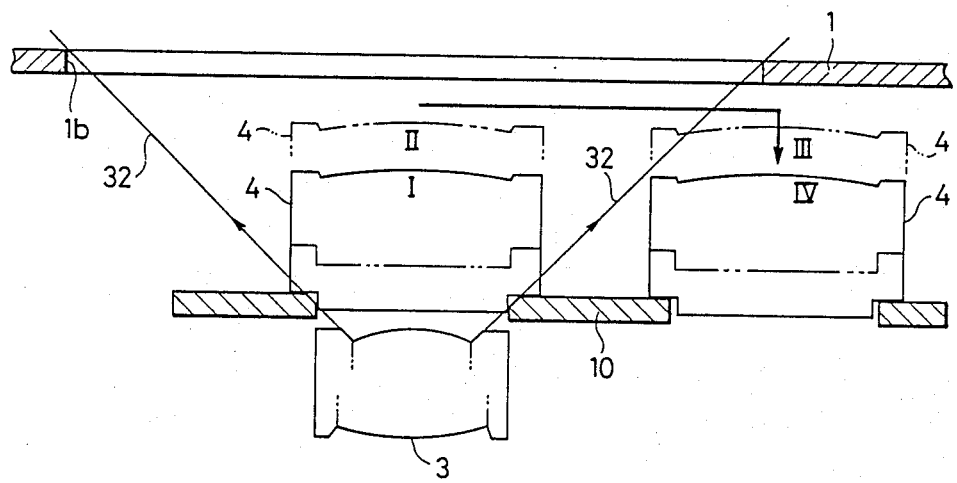
FIG. 12 illustrates the movement of the sub lens.

The retraction of the sub lens 4 out of the optical path in the aforementioned embodiment of the present invention will now be described in more detail in connection with FIG. 12.

The sub lens 4 is moved from the fully inserted position I upwardly to a position II along the optical axis of the main lens 3. The sub lens 4 is then moved from the position II to a position III in the horizontal direction perpendicular to the optical axis. The sub lens 4 is finally moved downwardly from the position III to a position IV at which it is fully retracted out of the optical path 32 of the main lens. The movement of the sub lens 4 from the position III to the position IV is made in the direction opposite to the direction in which the picture taking light beam from the main lens. Due to the retraction of the sub lens in such a direction, the camera may be designed to be more compact compared with the prior art structure in which the sub lens is shifted only in the horizontal direction.

Figure 13:
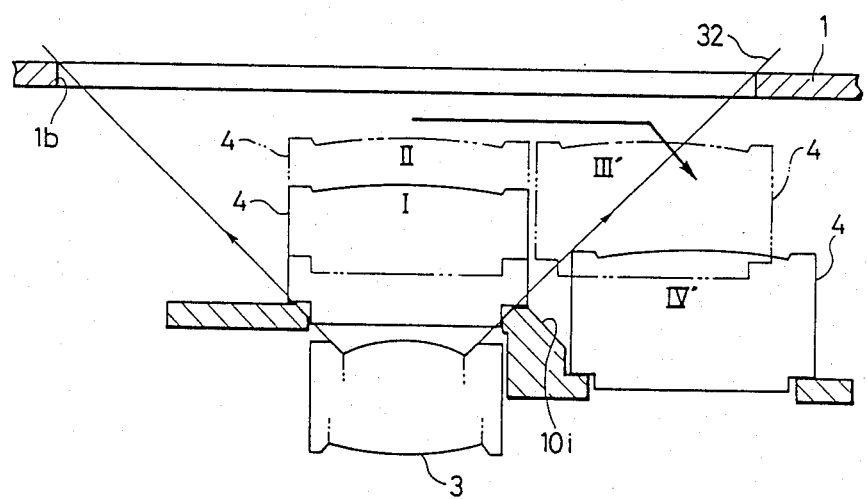
FIG. 13 illustrates modified movement of the sub lens.

In another embodiment of the present invention shown in FIG. 13, a position IV' at which the sub lens 4 is fully retracted out of the optical path is in front of the position I with respect to a direction along the optical axis. Therefore, the sub lens 4 can be retracted nearer the main lens 3 such that the camera will be even more compact. In this embodiment, there is formed a ramp 10i between two openings determining the positions I and IV' of the sub lens 4. When the sub lens 4 is moved from the position I to the position II by the same mechanism as that in the aforementioned embodiment, it is then moved horizontally through the first half of the roation of the holder 27. Through the second half of the rotation of the holder 27, the sub lens 4 is guided toward the position IV' by the ramp 10i.

The dust cover of another embodiment will now be described. A camera 401 shown in FIGS. 14A and 14C comprises a base plate 10 moving along the optical axis together with the main and sub lenses 3 and 4 as in the previously described embodiments. The camera also comprises a cover 402 for covering the front face of the main lens.

A knob 405 is similarly provided on the camera housing and has three positions, that is, a telephoto position shown in FIG. 14A in which the main lens 3 is extended toward the object side and the sub lens 4 is inserted into the optical path of the picture taking optical system, a wide-angle position shown in FIG. 14B in which the main lens 4 is retracted in the camera housing and the sub lens 4 also is retracted in its inoperative position, and an OFF position shown in FIG. 14C at which the main lens 3 is in its retracted position and the cover 402 is closed.

The camera housing comprises two longer and shorter conductive lands which are adapted to contact the corresponding slide contacts on the knob 405. The longer conductive land defines a switch SW1 as shown in FIG. 9 with the corresponding slide contact while the shorter conductive land defines a switch SW2 as shown in FIG. 10 with the corresponding slide contact.

Figure 15:
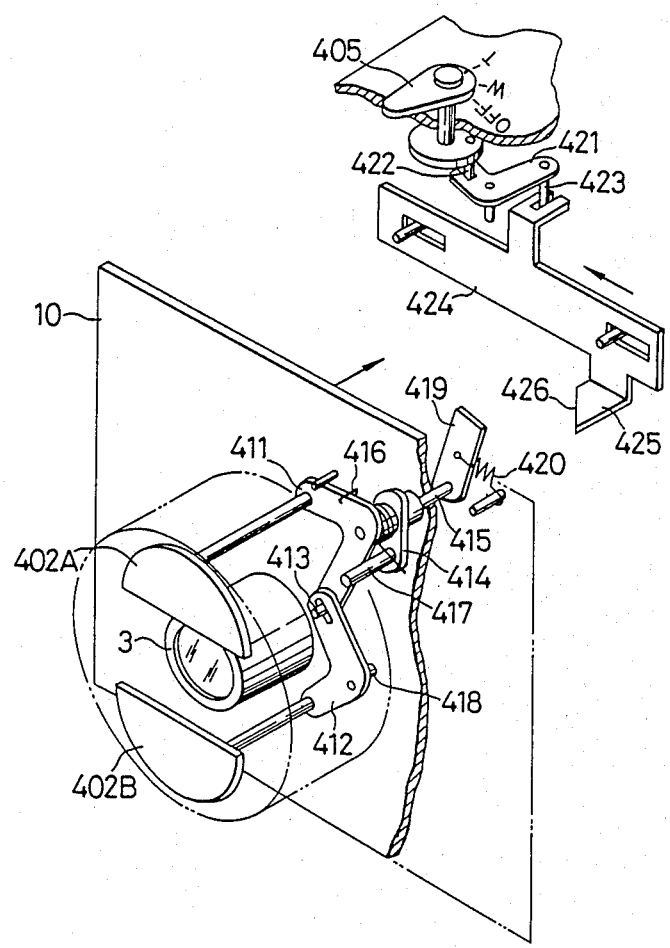
FIG. 15 is a perspective view of a mechanism for driving a dust cover.

As seen from FIG. 15, the cover consists of two blocking plates 402A and 402B each of which is supported on the end of one of two crank levers 411 and 412 which are connected with each other through a pin 413.

The base plate 10 rotatably supports a transmission shaft 415 on one end of which a flange 414 is fixedly mounted. The flange 414 rotatably supports one of the crank levers 411 which is biased counter-clockwise under the action of a coil spring 416 to engage a pin 417 on the flange under pressure at all times. The other crank lever 412 is supported by a pin shaft 418. The other end of the shaft 415 includes a lever 419 fixedly mounted thereon and biased by means of a tension spring 420.

The rotation of the knob 405 is transmitted to the crank lever 421 through an eccentric pin 422 to pivot a pin 423 on the lever 421. The pin 423 is connected with a slide plate 424 supported by the housing. When the crank lever 421 is rotated, the slide plate 424 is adapted to move parallel to the base plate 10. The slide plate 424 includes an arm 425 formed therein, which arm 425 has a cam face 426 engageable with the lever 419.

Figure 16A:
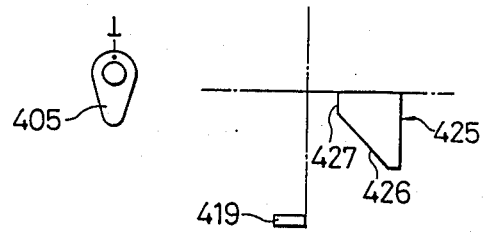
FIGS. 16A, 16B, 16C and 16D illustrate the positional relationship between the primary parts shown in FIG. 15.
Figure 16B:
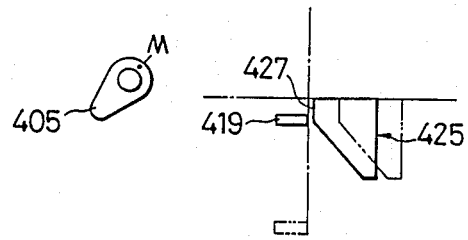
Figure 16C:
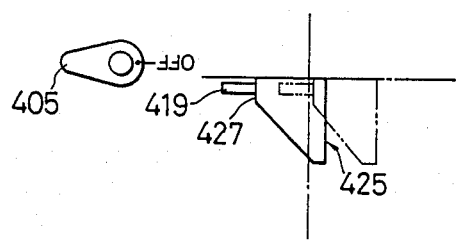
Figure 16D:
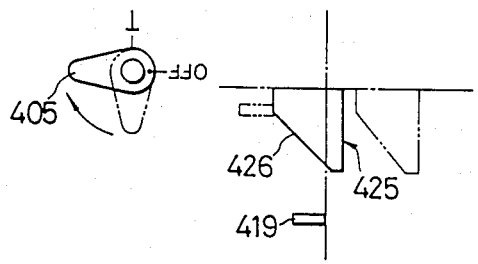

As seen from FIGS. 16A and through 16D, the positional relationship between the pivotal lever 419 and the arm 425 is such that when the knob 405 is in the telephoto position, the distance between the lever 419 and the arm 425 is increased with the left side 427 of the arm 425 being spaced away from the optical axis of the lever 419 (see FIG. 16A). When the knob 405 is shifted to the wide-angle position as shown in FIG. 16B, the lever 419 is moved to a position shown by solid lines with the movement of the base plate 10. The arm 425 also is moved to a position shown by solid lines. In such a case, the left side of the arm 425 is positioned near the lever 419 without contact. When the knob 405 is then placed in the OFF position as shown in FIG. 16C, the arm 425 is inserted into the path of the lever which in turn engages the left side 427 of the arm to be forcedly moved leftwardly. The lever 419 is then rotated counter-clockwise as viewed in FIG. 16C to close the cover 402. When the knob 405 is rapidly rotated from the telephoto position to the OFF position as shown in FIG. 16D, the arm 425 is moved to the position shown by solid lines prior to movement of the lever 419. Thereafter, the lever 419 is moved to a position shown by phantom lines along the cam face 426.

In the above arrangement, the arm 425 does not provide any action on the lever 419 while the knob 405 is in either of the positions opposed to the letters "T" and "W". Therefore, the cover 402 remains opened in front of the picture taking optical system as shown in FIG. 15.

When the knob 405 is placed at the "OFF" position and if the picture taking optical system has been placed at the wide-angle mode, the arm 425 is moved with the movement of the slide plate 424 to rotate the lever 419. When the picture taking optical system has been in the telephoto mode, the base plate 10 is moved upwardly as viewed in FIG. 16D with the lever 419 so that the cam face 426 will cause the lever 419 to rotate.

In any event, the rotation of the lever 419 causes the flange 414 to rotate such that the cover sections 402A and 402B will be moved toward each other through the crank levers 411 and 412 to close the cover fully.

Figure 17:
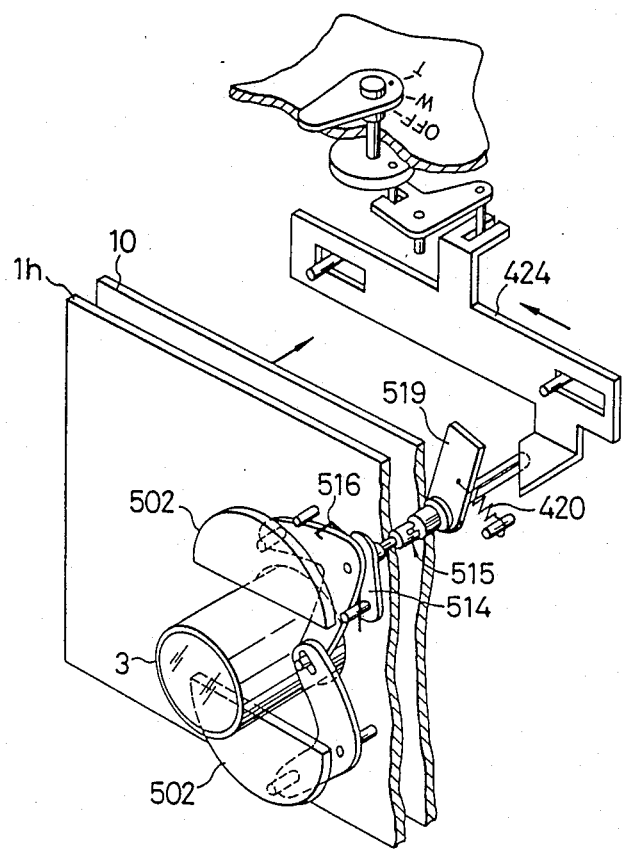
FIG. 17 is a perspective view of a modified mechanism for driving the dust cover.

In another modification shown in FIG. 17, the main lens 3 is moved with the base plate 10, but a cover 502 is not moved along the optical axis. More particularly, a flange 514 is fixedly mounted on one end of a shaft 515 which is rotatably supported by the fixed wall 1h of the camera housing against movement along the axial direction. The shaft 515 extends through the rotational center of a lever 519 which is rotatably supported by the base plate 10. The lever 519 is adapted to engage a key groove formed on the shaft 515. Thus, the lever 519 can be rotated with the shaft 515 and also slidably moved along the shaft 515.

In the arrangements shown in FIGS. 15 and 17, the slide plate 424 is biased in the direction of the adjacent arrow by means of a spring. By increasing the action of this spring so as to be larger than that of the spring 420 on the lever 419 or 519, the flange 414 or 514 and spring 416 or 516 may be omitted, so as to connect the crank levers directly with the shaft 415 or 515, resulting in a simpler construction.

I claim:
1. A camera comprising:
  a housing;
  a photographing lens system having an optical axis and being adapted to slide in the direction of the optical axis between a position projected from said housing and a position retracted from said projected position toward said housing;
  a cover member adapted to be closed forwards of said lens system to protect said lens system; and
  a cover driving means having a coupling member moved in the optical axis direction together with said lens system to close said cover member.

2. A camera according to claim 1, wherein said cover member is displaced in response to said coupling member along a plane perpendicular to said optical axis.

3. A camera according to claim 1, further comprising actuating means for engaging said coupling member, when said lens system is slid to said retracted position, to operate said coupling member.

4. A camera according to claim 3, further comprising means for operating said actuating means between a position acting on said coupling member and a position not acting on said coupling member.

5. A camera according to claim 4, further comprising electric circuit means adapted for the control of photographing and switch means actuated to energize said electric circuit means, and wherein said operating means interlocks with said switch means and operates said actuating means at said position acting on said coupling member when said switch means is actuated to energize said electric circuit means.

6. A camera according to claim 1, wherein said cover member is disposed forwards of said lens system and moved in the optical axis direction together with said lens system.

* * * * *